Feb. 5, 1935.   I. EREMEEFF   1,990,023
WAVE PRODUCTION
Filed July 10, 1930   3 Sheets-Sheet 1

INVENTOR.
Ivan Eremeeff

Feb. 5, 1935.  I. EREMEEFF  1,990,023

WAVE PRODUCTION

Filed July 10, 1930  3 Sheets-Sheet 2

Inventor.
Ivan Eremeeff

Feb. 5, 1935.  I. EREMEEFF  1,990,023
WAVE PRODUCTION
Filed July 10, 1930   3 Sheets-Sheet 3
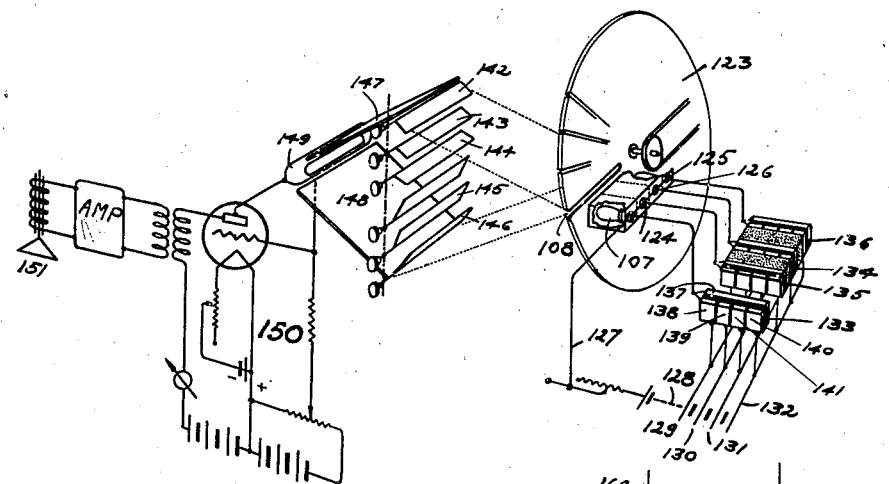
FIG. 7
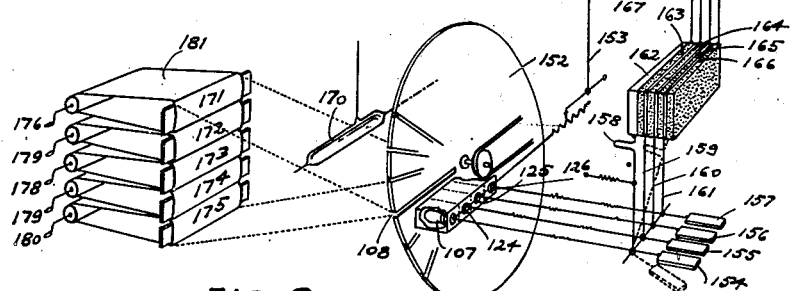
FIG. 8
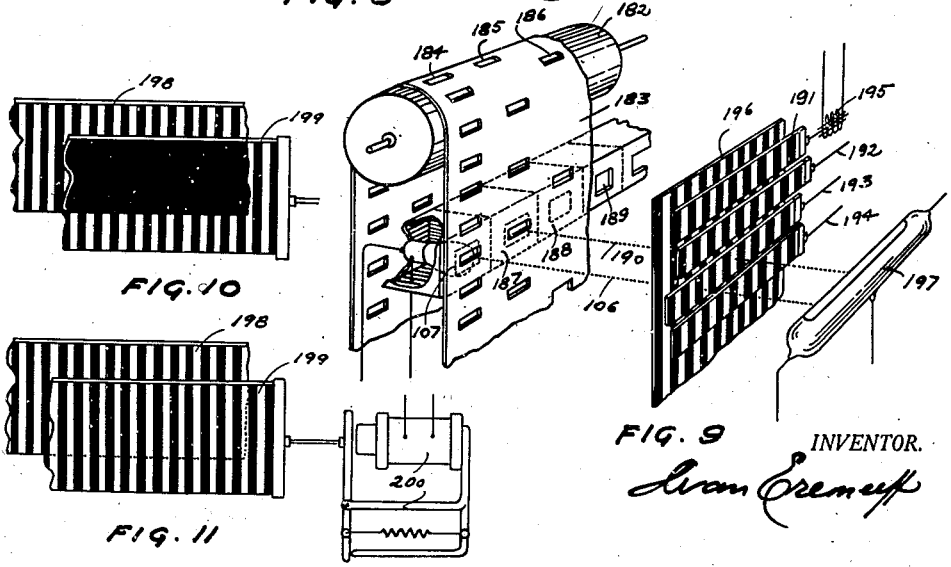
FIG. 10
FIG. 9
FIG. 11
INVENTOR.
Ivan Eremeeff Patented Feb. 5, 1935

1,990,023

UNITED STATES PATENT OFFICE 1,990,023

WAVE PRODUCTION

Ivan Eremeeff, Philadelphia, Pa.

Application July 10, 1930, Serial No. 466,980

4 Claims. (Cl. 250—41.5)

My invention relates to a method and means for producing desired wave forms of energy, such as light energy, sound energy, electrical energy, and the like, and utilizes the principles disclosed in several prior applications of mine, No. 427,-628, filed February 11, 1930, 427,629, filed February 11, 1930, 427,630, filed February 11, 1930, 453,090, filed May 16, 1930, 442,025, filed April 5, 1930, 257,061, filed February 25, 1928, and my Patent 1,948,169 issued February 20, 1934.

One of the objects of my invention is to devise a method and means which permit of producing desired wave forms of an energy, by converting or altering an energy from one form into another, such as altering an uninterrupted light energy into a pulsating light energy, or converting a direct electric current into a pulsating or alternating electric current, etc.

Another object of my invention is to devise a method and means for producing a desired form of light energy, sound energy, electrical energy, and like energies, for musical, television, and signaling purposes.

A further object of my invention is to provide a method and means by which an energy can be converted, for the purpose of obtaining an energy with a desired wave form.

The nature and objects of my invention will be more fully understood from the following specification and claims, reference being had to the accompanying drawings, in which:

Figures 6A, 6B:
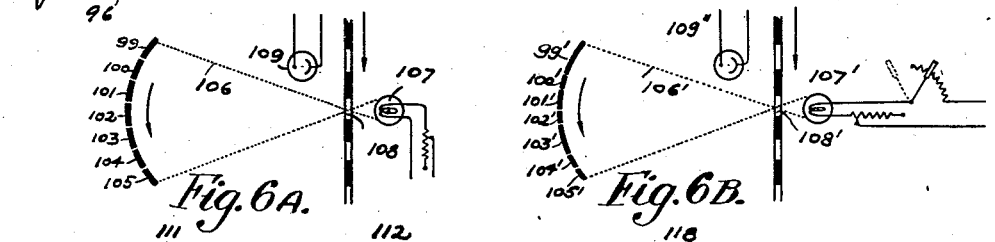
Figure 6A:
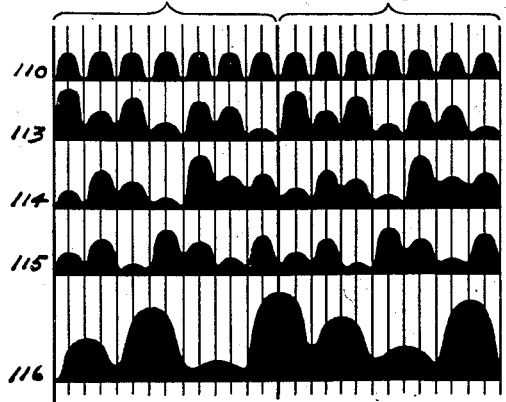
Figure 6B:
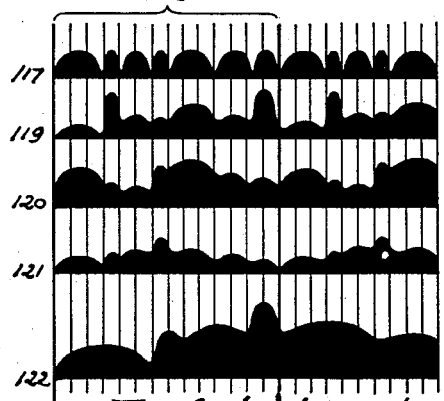

Fig. 6—A is a diagrammatic view of a means for varying an uninterrupted light energy into a pulsating light energy of a predetermined uniform order of variations in its intensity.

Fig. 6—B is a diagrammatic view of slightly modified means for varying an uninterrupted light energy. Fig. 6—A' is a graph of curves which illustrate the operation of the device shown in Fig. 6—A, and Fig. 6—B' shows curves which illustrate the function of the device shown in Fig. 6—B.

Fig. 7 represents a diagrammatic view of a device for converting a plurality of uninterrupted light energies of predetermined controllable intensities, and combining them into a complex pulsating light energy of predetermined, adjustable wave form, the said complex pulsating light energy later being converted into sound energy.

Fig. 8 is a device similar to that shown in Fig. 7, modified in construction of details.

Fig. 9 represents a device, whose purpose is similar to that of the devices shown in Figs. 7 and 8, the differences occurring in details of construction, such as the light valves and the construction in general.

Figs. 10 and 11 represent light valves, which are electrically operated, for varying the intensity of the light energy passing through or reflecting from them.

Figure 1:
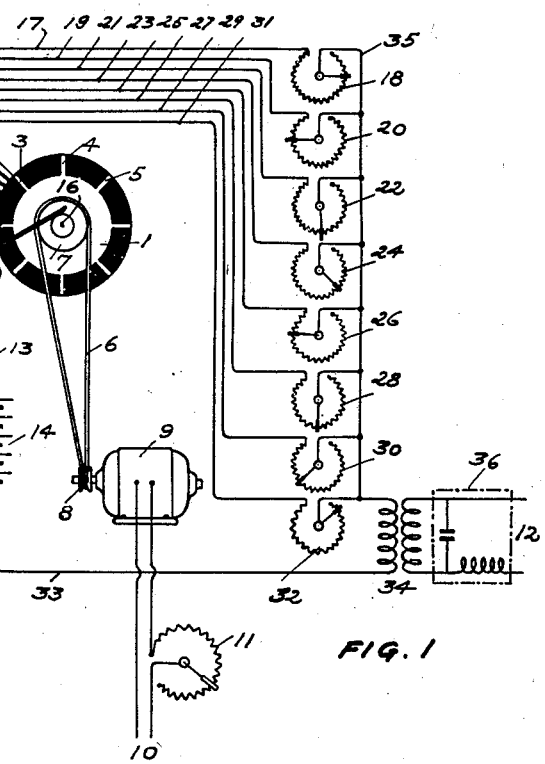
Fig. 1 represents a diagrammatic view of a device for converting direct electric current into pulsating electric current of a desired wave form.

In Fig. 1, 1 represents a revolving member, which is suitably provided with a series of contacts such as 2, 3, 4, 5, etc. The said revolving member is journalled in suitable bearings, and is made to rotate by means of the belt 6, which runs over the pulley 7 and the motor pulley 8 of the motor 9. The electric current of the source of electrical energy 10 operates the said motor 9, and is provided with the suitable resistance 11 for maintaining a desired speed of revolution of the said motor.

For producing electrical energy waves of predetermined frequency and predetermined variations of intensity, in the output 12, the line 13 of the source of electrical energy 14 is connected with the brush 15 of the commutator 16, which is brought into connection with the contacts 2, 3, 4, 5, etc., of the revolving member 1.

The circuit 17 is provided with its own contacting brush, for engaging with the revolving member 1, including in its line the adjustable rheostat 18. Similarly, the circuit 19, which is also provided with its own contacting brush, includes in its line the adjustable rheostat 20. The circuits 21, 23, 25, 27, 29, and 31 are likewise provided with their own contacting brushes, and include in their lines respectively, the rheostats 22, 24, 26, 28, 30, and 32.

The lines 33 and 35 join in the primary of the transformer 34, whose secondary leads to the output 12. 36 represents a low-pass filter for eliminating all static from the brushes which contact with the revolving member 1.

The operation of this device will be made more clear in the explanation of the graph depicted in Fig. 3.

Figure 2:
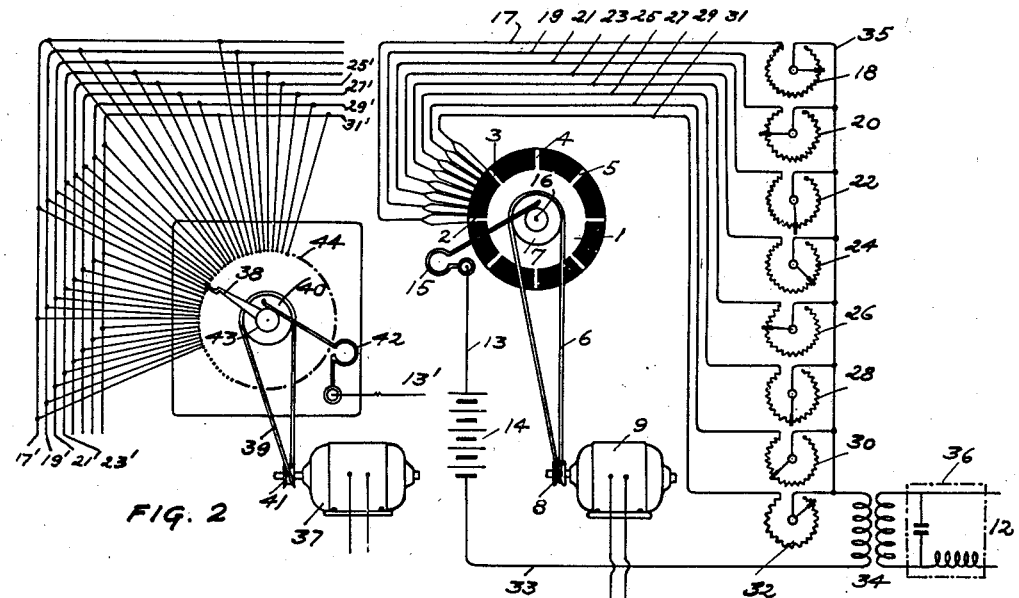
Fig. 2 is a diagrammatic view of a device, which is similar to the device shown in Fig. 1, with modified wiring.

In Fig. 2, the motor 37 drives the revolving member 38, by means of the belt 39, which runs over the pulleys 40 and 41. The line 13′ connects to the brush 42 of the commutator 43 which transmits electrical energy into the revolving member 38. The circuits 17′, 19′, 21′, 23′, 25′, 27′, 29′, and 31′, are connected consecutively to the contacts of the stationary commutator 44, over which the revolving member 38 slides while rotating. The circuits 17′ to 31′, inclusive, are provided with rheostats similar to 18, 20, 22, etc. of Fig. 1, and also include in their lines a transformer such as 34 of Fig. 1, and a suitable filter and output as 36 and 12 of Fig. 1.

Figure 3:
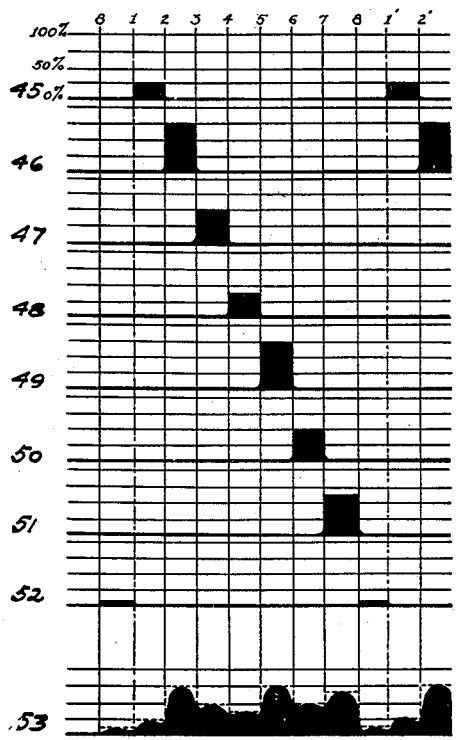
Fig. 3 is a graph of different values of electrical energy, taken successively at a predetermined fraction of time, by a device, such as shown in Figs. 1 and 2.

In Fig. 3, I have shown eight graphs, 45, 46, 47, 48, 49, 50, 51, and 52, which illustrate the various intensities of the electrical energy which is successively passed into the individual brushes of the contacts 17, 19, 21, 23, etc. as shown in Fig. 1, as one of the contacts, such as 3, sweeps over the series of said brushes, during the rotation at desired speed of the revolving member 1 of Fig. 1. The intensities of the electrical energy are adjustable, being regulated by means of the variable rheostats 18 to 32, inclusive, already described in reference to Fig. 1.

For example, we may surmise that the graphs 45 to 52, inclusive, respectively represent the percentages of electrical energy, which the rheostats 18 to 32, inclusive, of Fig. 1, have been set to pass, from the source of electrical energy 14 to the output 12, also of Fig. 1. Therefore, as shown, the rheostat 18 has been set to pass 25% of electrical energy from the circuit 17. The rheostat 20 has been set to pass 75%, the rheostat 22 has been set to pass 50%, the rheostat 24 has been set to pass 30%, the rheostat 26 has been set to pass 75%, the rheostat 28 has been set to pass 50%, the rheostat 30 has been set to pass 70%, and the rheostat 32 has been set to pass 10% of electrical energy. In Fig. 3, I have indicated the percentage divisions, and each graph is shown representing the percentage of intensity to which the rheostats of Fig. 1 have been adjusted.

53 represents a complex pulsating electrical energy, which is the sum of the successive impulses of electrical energy which are in the output 12, while the revolving member 1 rotates.

Figure 4:
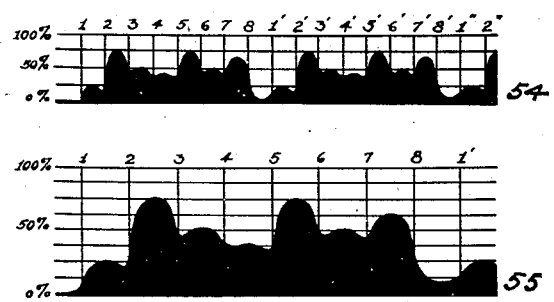
Fig. 4 represents a graph of the sum of a plurality of different values of electrical energy, which have been produced by a device, such as shown in Fig. 1 or 2, at a predetermined fraction of time.

In the graph of Fig. 4, 54 represents the wave 53 of Fig. 3 in repetition, which takes place during the time that two contacts such as 3 and 4 of the revolving member 1 of Fig. 1, pass over the brushes as previously described. 55 represents the wave which results from reducing the speed of rotation of the revolving member 1 of Fig. 1, to one-half the speed at which it had been rotating to produce the wave form of electrical energy represented by the graph 54.

Figure 5:
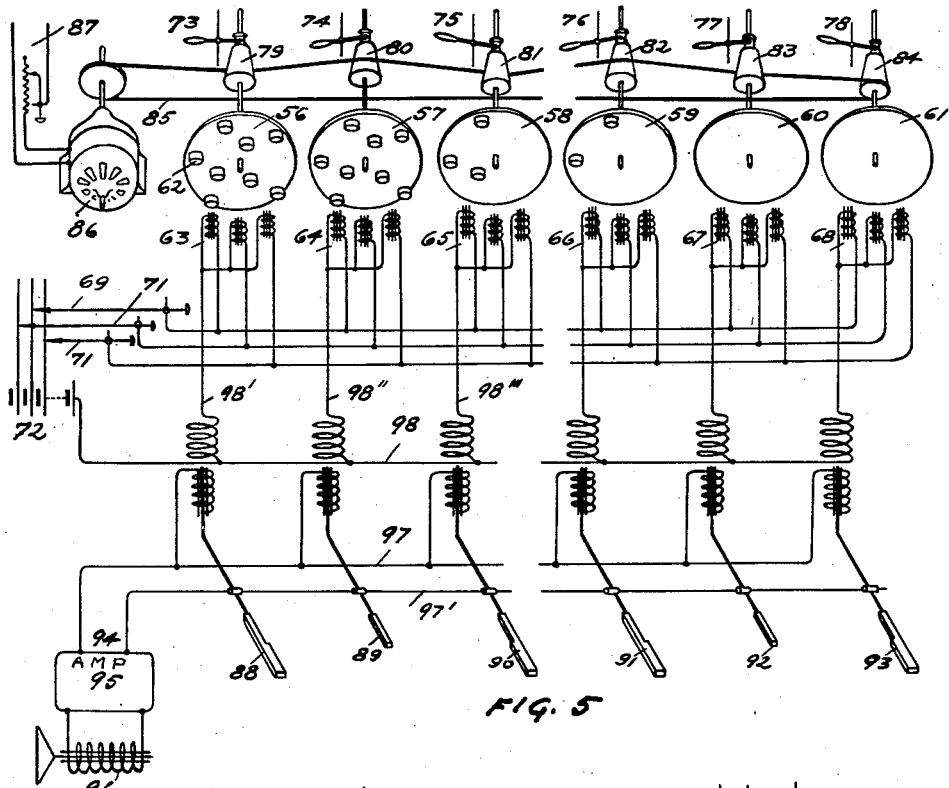
Fig. 5 represents a diagrammatic view of a device for producing a plurality of different electrical energies of predetermined wave forms, in a simultaneous manner.

Fig. 5 represents a diagrammatic view of a device which produces a plurality of complex wave forms of pulsating electrical energy, each said pulsating electrical energy having its own predetermined frequency. This device is equipped with antistatic switches, for individually selecting the desired pulsating electrical energies, whose intensities may be controlled by the same said switches.

The device shown in this figure is provided with a common adjusting means for controlling the intensities of the individual impulses which constitute the final complex pulsating electrical energies, in the predetermined order in which they are successively produced. This device is based on principles similar to those of the devices illustrated in Figs. 1 and 2. Instead of employing contacting brushes for the purpose of transmission, as shown in Fig. 1, a magnetic flux is used in the device shown in Fig. 5, and in place of using rheostats for controlling the intensities of the individual impulses of electrical energy, as in Fig. 1, the device of Fig. 5 permits of taking different amounts of electrical energy from different taps of the source of electrical energy.

Another difference between the devices of Fig. 1 and Fig. 5 is that Fig. 1, the wave length of the wave form of pulsating electrical energy is increased or decreased in size, depending upon the speed of rotation of the revolving member 1, whereas in Fig. 5, the revolving members or phonic wheels, which I will describe later, are rotated at suitable, predetermined, adjustable, constant speeds.

Turning to the reference numerals of Fig. 5, 56, 57, 58, 59, 60, and 61 represent revolving members or phonic wheels, each of which is provided with a predetermined number of bosses, perforations, or depressions, as 62, or any other suitable means for creating successive variations in the magnetic flux in the groups of magnets, such as 63, 64, 65, 66, 67, and 68. The intensity of the said magnetic flux is controlled by means of the adjusters 69, 70, and 71, which connect to different taps of the source of electrical energy 72.

The said revolving members 56 to 61, inclusive, are provided with individual means, 73, 74, 75, 76, 77, 78, for controlling the speeds at which they rotate with the aid of the cone-shaped pulleys 79, 80, 81, 82, 83, and 84, over which the endless belt 85 is driven by the motor 86. The said motor 86 is controlled by the resistor 87.

The switches or keys 88, 89, 90, 91, 92, and 93, are provided for selecting desired frequencies of pulsating electrical energy in the output 94 and the amplification means 95, the said frequencies of pulsating electrical energy later being converted into sound energy by 96.

The said switches or keys, 88 to 93, inclusive, connect the circuit 97 and 97′ with the circuit 98 and 98′, 98″, etc. without creating static. Each switch or key regulates the intensity of the pulsating electrical energy in the output 94, depending upon the position of its own primary coil, in relation to its own secondary coil.

The regulation of the adjusting means 69, 70, and 71 of this figure, is similar in purpose to the setting of the rheostats 18, 20, 22, etc., of Fig. 1. For convenience of illustration, I have shown only three adjusting means in this figure, whereas in Fig. 1, there are eight separate means for controlling the intensities of the individual impulses of pulsating electrical energy, as described in reference to Fig. 3.

Figs. 1, 2, 3, 4, and 5, which are included in various forms in my already mentioned copending applications, have been described for the purpose of making more clear the principle involved in my invention.

Figs. 6—A and 6—B represent diagrammatic views which expressly outline the fundamental principle of my invention. 6A is a device, in which 99, 100, 101, 102, 103, 104, 105 represent a plurality of suitable reflecting surfaces, each of which is independently adjustable to a predetermined degree of reflection. That is, the light beam 106 from the source of uninterrupted light energy 107, is sent through a plurality of openings, such as 108, of the revolving member which passes before the source of light energy 107 in a downward motion, as indicated, and the said light beam reflects back from the said reflecting surfaces to the photo-sensitive element 109.

In the case where 99, 100, 101, 102, etc. represent reflecting surfaces, the light beam 106 sweeps in a downward motion over the said surfaces and is successively reflected back to the photo-sensitive element 109, which converts the successive reflected impulses of light energy into pulsating electrical energy. The said electrical energy may then be utilized for any suitable application. In the following figures of my drawings, I have shown the reflecting or translucent surfaces in detail, illustrating how they may be adjusted to the desired degrees of reflection or to the proper amount of translucency. It is to be understood, that the adjustment of the said reflecting or translucent surfaces controls the intensity of the light energy which is reflected from or passed through them. Therefore, the impulses of light energy which fall upon the said photo-sensitive elements have predetermined intensities as well as a predetermined fraction of time of production.

In the diagram 6A', 110 represents a pulsating electrical energy, consisting of a group of consecutively produced impulses, such as 111, which is shown in repetition as 112. The impulses of the pulsating electrical energy represented by 110, are those which are converted by the photo-sensitive element 109 or 109' of Fig. 6A, from the successive light impulses resulting when the said light beam 106 reflects or passes through the said reflecting or translucent surfaces 99 to 105, inclusive, provided that the said surfaces have been adjusted to the same degree of reflection or translucency.

Referring to 6A, it can be seen that there are seven equally placed reflecting or translucent surfaces. In 6A' the group 111 contains seven equal impulses of uniform frequency and intensity, the entire seven of which are the result of one movement, in a downward direction, of the light beam 106, due to the motion of the revolving member which contains the openings such as 108. As the revolving member continues to rotate, there is a repetition of the group of impulses, as represented by 112.

113 represents the impulses, still in groups of seven, as shown in 110, having the same frequency, but different intensities, due to the adjustment of the reflecting or translucent surfaces, which have been regulated to vary the intensity of the light beam 106 as it passed over or through them. 114 and 115 show the impulses produced by A, with different predetermined orders of intensities, but the frequency having maintained itself the same. 116 represents seven impulses of electrical energy, whose order of intensities and whose frequency are proportional to those of 115, which are the result of reducing the speed of revolution of the revolving member of A to one half of the speed at which it was revolving when it produced the impulses of 115. Therefore, it can be said that the wave forms of pulsating electrical energy produced by the device A keep their proportional dimensions, though the speed at which the revolving member travels may be adjusted as desired.

B represents a device which is similar to the device A. The main difference lies in the fact that the reflecting or translucent surfaces in B are adjustable not only in degree of reflection of light reflecting from them to the photo-sensitive elements, but are also adjustable in the fraction of time at which the light beam as 106' is varied by them. Another feature of B is the switch of the light source 107', which will be described in reference to the following figures.

In 6B', 117 represents the impulses resulting when the light beam 106' passes through or reflects from the surfaces 99' to 105', inclusive, the said impulses having the same intensities as those of 110 of 6A'. 118 represents a group of seven impulses whose intensities are alike, but whose successive production per fraction of time is different, due to the fact that the reflecting or translucent surfaces of B are not uniform. It can be seen that the group of impulses of 118 was produced at the same fraction of time at which the group of 111 of 6A' were produced, therefore the frequencies of the groups or units consisting of the individual impulses are the same. By changing the fraction of time of production of each impulse, the wave form of the pulsating electrical energy which results is altered as desired. 119, 120, 121 represent groups of impulses, whose fraction of time of production has been changed as described in reference to 117. 122 shows the beginning of a wave form with similar vertical and horizontal proportions to the wave form 121, resulting from speed reduction of the member containing the slots such as 108', to one half the speed at which it revolved to produce the impulses of 121.

In Fig. 6, A and B have been shown as devices in which a photo-sensitive element responds to light impulses of successively varied intensities. The same results can be obtained by simultaneously flooding the said reflecting or translucent surfaces with light, then the spaces between the openings, such as 108, 108', of the revolving member, will successively cast shadows on the said reflecting surfaces, or translucent surfaces, as preferred. In this way, different predetermined amounts of light energy will be deducted as the light energy successively falls upon the said reflecting or translucent surfaces. To operate in this manner, the device used must be adjusted so that the shadows falling upon the reflecting or translucent surfaces are the same size or smaller than the individual surfaces themselves.

Details of construction for devices similar to A and B will be more fully described in the following figures.

In Fig. 7, 123 represents a revolving member having openings such as 108. 107, 124, 125, and 126 represent sources of uninterrupted light energy, shown suitably encased for preventing interaction of the beams. The line 127 leads to the source of electrical energy 128, which is provided with a plurality of different taps such as 129, 130, 131, 132, each said tap having connection with one of the individual keys or switches 133, 134, 135, and 136.

By placing a suitable conductor across the upper surface of the said keys, 133, 134, 135, and 136, the light energy in the sources 107, 124, 125, etc. will be switched on. For example, in the key 133, it can be seen that if a conductor is placed so that the plate 137 connects with either of the plates 138, 139, 140, or 141, each of the last mentioned plates being fed with electrical energy of a different amount, the light energy in the source 107 will be controlled as desired. The same thing applies to the other keys, such as 134, 135, and 136, which are suitably separated by insulators.

142, 143, 144, 145, and 146 represent translucent surfaces, which are similar to those shown diagrammatically in 6A and 6B. The said translucent surfaces may be regulated to a desired degree of translucency, for varying the uninterrupted light energy originating in the sources, such as 107, 124, 125, and 126. 147 and 148 represent suitable shields, and 149 represents a photo-sensitive element, whose purpose is the same as the photo-sensitive element 109 of A in Fig. 6. The said photo-sensitive element may be placed before the translucent surfaces if desired.

150 represents a suitable circuit, and 151 is an output for the sound energy which results after being converted from photo-electrical energy.

In Fig. 8, 152 represents a revolving member of the same description as the revolving member shown in Fig. 7. The member 152 also is provided with openings, such as 108. 107, 124, 125, and 126 represent sources of uninterrupted light energy, such as those shown in Fig. 7, the said light sources being connected to the line 153. Each light source has individual connection with a key, such as 154, 155, 156, and 157. The said keys are provided with the members 158, 159, 160, and 161, which, when not in use, rest upon the insulator 162. By depressing any of the said keys, the cooperating member of the depressed key will slide over the contacts 163, 164, 165, and 166. Each of the said contacts, which are separated by a suitable insulator, is connected to its own tap of the secondary 167 of the transformer 168, the primary 169 of which is connected to the suitable source of electrical energy, to which it leads. With this key operation, the light energy of the light sources, such as 107, 124, 125, etc., can be controlled in its intensity as desired.

170 represents a photo-sensitive element, such as the one shown in Fig. 7, and diagrammatically in Fig. 6. 171, 172, 173, 174, and 175 represent adjustable reflecting surfaces, which are provided with the means for adjustment, 176, 177, 178, 179, and 180. The said reflecting surfaces are made to reflect different predetermined amounts of the light energy originating in the sources, such as 107 to 126, inclusive, due to the adjustment as desired of the endless belts as 181, which pass over them. The said belts are divided into sections, each of which is the same size as the individual reflecting surfaces. The said sections are so treated or are of such color or material, that they produce different degrees of reflection. All of the belts such as 181 are alike, and each is divided into sections of different colors. For example, if the belts are made of a white material, they may vary gradually from 100% reflecting power to 0% or a solid black. Of course, colors may be used in place of black and white. In times when reflection of either of the reflecting surfaces is not desired, any of the endless belts as 181 may be adjusted by either of the adjusting means as 176, 177, 178, 179, 180, so that a part of the belt, which has a 0% reflecting power, covers the reflecting surface which at the time is not to reflect light.

In Figs. 7 and 8, I have shown the revolving members 123 and 152 provided with openings, for breaking up the uninterrupted light energy produced by the light sources represented in both of the said figures as 107, 124, 125, and 126.

In Fig. 9, 182 represents a roller over which the revolving member or belt 183 turns at a predetermined speed. The said belt is provided with rows of perforations, such as 184, 185, and 186. The light sources 107, 187, 188, and 189 send their light beams, as 106, and 190 in a downward motion over the translucent light valves 191, 192, 193, and 194, the said motion of the light beams resulting as the belt 183 turns with the roller 182. 195 represents an electro-magnet which operates the light valve 191. A magnet such as 195 may be provided to individually operate each light valve. 196 is a shield of the same material and translucency as the light valves 191, 192, 193, etc. The operation of the said light valves and the shield will be more fully described in reference to Figs. 10 and 11.

The photo-sensitive element 197 responds to the light beams originating in the sources 107, 187, 188, etc., as they successively pass through the light valves 191, 192, 193, etc., and the shield 196, in a downward motion. The light beams are thus adjusted in their intensity, due to the regulation of the said light valves, which pass a predetermined amount of light through themselves and the cooperating shield 196.

Fig. 10 shows an enlarged view of a light valve, such as shown in Fig. 9. It can be seen, that by actuating either 198 or 199 in a side to side direction, different amounts of light can be passed through the transparent sections. In this case, however, the members 198 and 199 have been so adjusted, that no light may pass through them.

In Fig. 11, the members 198 and 199 are shown in open position. That is to say, when the members are in this position, in relation to each other, the full amount of light energy may be passed through them. I have illustrated the members in both open and closed positions, but, of course, the members may be made to assume any desired position between open and closed, in order to allow a predetermined amount of light energy to pass through them. The electro-magnet 200 serves as a means for driving the member 199 at a predetermined speed, or for keeping it in a desired position.

Figs. 7 to 11, inclusive, illustrate means, in various forms, which I can selectively use in carrying out my invention, and they were primarily meant to describe more clearly the functions of the devices shown in Fig. 6.

In describing the various devices depicted in the accompanying drawings, it has not been mentioned that various suitable modifications of the devices may be employed if it is called for. I do not, therefore, wish to limit myself to the exact details of construction, since I do not claim the structural designs which were used mainly to illustrate the various forms in which my methods may be applied.

Having thus fully described my invention, what I claim as new and useful is:—

1. A method for producing and varying during its production, a pulsating electric current of predetermined frequency, predetermined intensity, and predetermined wave form, by producing and combining in successive order, a predetermined number of electrical impulses, each said impulse having a predetermined intensity, altering the wave form and intensity of said pulsating electric current by predeterminedly and independently varying the individual intensities of said predetermined number of electrical impulses without discontinuing production of pulsating electric current.

2. A method for producing pulsating electric current by successively producing impulses of electric current, each said impulse having a predetermined intensity, said impulses being produced at a predetermined fraction of time in predetermined repeated order, gradually varying the number of said impulses of electric current, independently varying the individual intensities of said impulses, and varying the fraction of time in which said impulses are produced.

3. A method for producing pulsating electric current of predetermined wave form by producing in successive order, a predetermined number of electrical impulses, each said impulse having a predetermined intensity, varying the wave form of said pulsating electric current without discontinuing production of pulsating electric current, by independently varying the individual intensity of each successive said impulse at the time of its production.

4. A method for producing and varying during its production, a pulsating electric current of predetermined wave form, by producing in predetermined successive order a predetermined number of light impulses, each said light impulse having predetermined intensity, successively converting said light impulses into pulsating electric current without discontinuing production of light impulses, predeterminedly and selectively varying any portion of the wave form of the said pulsating electric current without altering the remaining portions, during the continuous production of pulsating electric current, by varying the intensities of the corresponding light impulses from which said portion of the wave form of said pulsating electric current is produced.

IVAN EREMEEFF.